United States Patent
Bennett et al.

(10) Patent No.: US 6,759,162 B2
(45) Date of Patent: Jul. 6, 2004

(54) INCREASED VOLUME ELECTROCHEMICAL CELL

(75) Inventors: William R. Bennett, North Olmsted, OH (US); Robert E. Ray, Jr., Strongsville, OH (US); Diana Dreher, Troy, NY (US)

(73) Assignee: Eveready Battery Company, Inc., St. Louis, MO (US)

( * ) Notice: Subject to any disclaimer, the term of this patent is extended or adjusted under 35 U.S.C. 154(b) by 319 days.

(21) Appl. No.: 09/804,012

(22) Filed: Mar. 12, 2001

(65) Prior Publication Data

US 2001/0055715 A1 Dec. 27, 2001

Related U.S. Application Data

(60) Provisional application No. 60/188,385, filed on Mar. 10, 2000.

(51) Int. Cl.[7] .................. H01M 6/12; H01M 6/46; H01M 2/00; H01M 2/02; H01M 6/08
(52) U.S. Cl. .................. 429/164; 429/162; 429/163; 429/27
(58) Field of Search .................. 429/27, 164, 162, 429/163

(56) References Cited

U.S. PATENT DOCUMENTS

| | | | |
|---|---|---|---|
| 3,440,110 A | 4/1969 | Arbter | 136/166 |
| 4,054,726 A | * 10/1977 | Sauer et al. | 429/66 |
| RE31,413 E | * 10/1983 | Jaggard | 429/27 |
| 4,491,624 A | 1/1985 | Sarbacher et al. | 429/27 |
| 5,279,905 A | * 1/1994 | Mansfield, Jr. et al. | 429/27 |
| 5,567,538 A | 10/1996 | Oltman et al. | 429/27 |
| 5,582,930 A | 12/1996 | Oltman et al. | 429/27 |
| 5,582,932 A | 12/1996 | Oltman et al. | 429/176 |
| 5,591,541 A | 1/1997 | Oltman | 429/176 |
| 5,658,356 A | 8/1997 | Burns | 29/623.2 |
| 5,662,717 A | 9/1997 | Burns | 29/623.1 |
| 5,804,327 A | 9/1998 | Oltman | 429/27 |
| 5,846,672 A | * 12/1998 | Bennett | 429/164 |
| 5,919,586 A | 7/1999 | Springstead et al. | 429/164 |
| 5,945,230 A | 8/1999 | Oltman | 429/27 |
| 5,945,234 A | 8/1999 | Burns | 429/66 |
| 6,042,957 A | 3/2000 | Oltman | 429/27 |

FOREIGN PATENT DOCUMENTS

| | | | |
|---|---|---|---|
| DE | 4141863 | 6/1992 | H01M/12/06 |
| JP | 02012754 | 1/1990 | H01M/2/02 |
| JP | 05217605 | 8/1993 | H01M/12/06 |
| WO | 95/10124 | 4/1995 | H01M/2/04 |

OTHER PUBLICATIONS

Eveready Battery Engineering Data, vol. 1A, copyright 1980, 1988, pp. 134–145.

* cited by examiner

Primary Examiner—Patrick Ryan
Assistant Examiner—Julian Mercado
(74) Attorney, Agent, or Firm—Russell H. Toye, Jr.

(57) ABSTRACT

An electrochemical cell is provided having an anode cup, a gasket, and a cathode can. The anode cup has a ratio of an upper diameter to a lower diameter greater than about 0.86 and a ratio of cup height at the upper diameter to cup height at the lower diameter of not greater than about 2.19. The external cup diameter exceeds an internal cup diameter to prevent nesting of anode cups during the assembly process. The cell has a ratio of the total height to the can height of greater than 1.35 and preferably a difference between the total height and can height of more than 0.04 inch.

21 Claims, 2 Drawing Sheets

INCREASED VOLUME ELECTROCHEMICAL CELL

CROSS-REFERENCE TO RELATED APPLICATION

This application claims the benefit of U.S. Provisional Application No. 60/188,385, filed Mar. 10, 2000, the disclosure of which is incorporated herein.

BACKGROUND OF THE INVENTION

This invention relates to alkaline electrochemical cells, typically to cells having a metal anode and an air cathode, commonly known as metal-air cells. More particularly, this invention relates to several structural features of the cell that improve the manufacturability of the cell, increase the internal volume of the cell available for active material, and improve the sealing of the cell.

Electrochemical cells are typically utilized in devices having a fixed volume available for the cell or cells. Therefore, in order to increase the volume of active material utilized in the cell, it is necessary to decrease the volume of the cell occupied by non-reactive components. Typically, this is accomplished in the field of metal-air cells by using can, cup and/or gasket components having reduced wall thicknesses.

The construction of the typical metal-air cell requires that a certain amount of volume otherwise available for active components is utilized in the creation of a step along the anode cup side wall. The step is utilized for the purpose of crimping the cell closed and is also utilized in the manufacturing process as a surface upon which force can be applied to urge the cup into a cell configuration with the cathode can and the gasket. Applicants have discovered that additional volume available for active material can be achieved by utilizing a shallow step in a metal-air cell. The shallow step increases the amount of volume available for active material while maintaining the ability to close, or crimp the cell effectively and to urge the cup into the desired position as required during the manufacturing process.

The typical metal-air cell is sealed by crimping the cathode can side walls over the step formed into the cup side wall. Applicants have discovered that a more effective seal is possible where the radius of the can crimp is greater than the radius of the cup forming the cup step. This seal is of particular advantage when used in conjunction with the shallow step of the present invention.

A shallow step creates an increased potential for the can also to nest with other cans during the manufacturing process. Either the can itself, or the assembly of the can and gasket, can tend to nest within like components as they are transported along a cell assembly line. This nesting is undesirable since the components must be separated prior to cell assembly. Applicants have discovered that this nesting can be prevented by maintaining certain internal and external diameters for the cup while still providing an enhanced volume available for active materials.

It is therefore an object of the invention to provide for an increase in the volume available for active material in an electrochemical cell such as a metal-air cell by providing a shallow step along the cup side wall.

It is further an object of the invention to provide for an improved seal for an electrochemical cell by maintaining a can crimp radius that is less than the radius defining the cup side wall step.

It is a further object of the invention to provide a cup or a cup and gasket assembly that is dimensioned such that nesting of like components is avoided.

SUMMARY OF THE INVENTION

The present invention provides an anode cup for an electrochemical cell, the anode cup comprising an upper external diameter and a lower external diameter, wherein the ratio of the upper diameter to the lower diameter is greater than or equal to about 0.86, and the ratio of the cup height at the upper diameter to the cup height at the lower diameter is not greater than about 2.19. For this minimum horizontal, or run, and maximum vertical, or rise, a shallow step is provided in accordance with the present invention.

The present invention further provides an anode cup for an electrochemical cell, the anode cup comprising a closed upper end, an open lower end and a side wall extending between the upper and lower ends, where the side wall comprises a step and a substantially vertical section between the step and the closed end. By extending the side wall vertically in the area above the step, the internal volume of a cell can be increased compared to a conventional cell, and the resultant increased volume cell advantageously fits within a conical cavity.

The present invention further provides an anode cup for an electrochemical cell where the cup comprises an upper end and a lower open end and side walls extending between the upper and lower ends, the cup having a first internal cup diameter measured at the lower open end, and an external cup diameter measured at the point where the cup corner radius blends into the cup side wall. The first internal cup diameter exceeds the external cup diameter. The cup has at least one step along the side walls, each such step defined by a first radius and a second radius along the side walls, where the first radius is toward the lower open end of the cup and the second radius is toward the upper end of the cup along the side walls. The cup has a second internal cup diameter measured at the point where the second radius blends into the cup side wall. The cup has first and second vertical heights measured from the lower end of the cup to the point where the cup corner radius blends into the side wall and to the point where the second radius of the step blends into the side wall, respectively. The external cup diameter exceeds the second internal cup diameter, and the difference of the first vertical height minus the second vertical height is greater than zero. By maintaining this relationship between the external and internal diameters of the cup, nesting of the cups is prevented during the cell assembly process in accordance with the present invention.

The present invention further provides for an anode cup and gasket assembly for an electrochemical cell. The anode cup comprises an upper end and a lower open end and a side wall extending between the upper and lower ends. The cup further comprises an external cup diameter measured at the point where the cup corner radius blends into the cup side wall. The side wall of the cup has a step formed between two substantially vertical sections. The gasket surrounds the open end of the cup, the gasket comprising an interior gasket portion disposed radially inward from the interior surface of the cup side walls and defining an inner gasket diameter. The external cup diameter exceeds the inner gasket diameter. By maintaining this relationship between the inner gasket diameter and the external diameter of the cup, nesting of the cup and gasket assembly is prevented during the cell assembly process in accordance with the present invention.

The present invention further provides for an electrochemical cell comprising an anode cup, a cathode can and a gasket disposed between the anode cup and the cathode can. The cup comprises an upper end, a lower open end and a side wall extending between the upper and lower ends. The cup further comprises at least one step along the side wall, each such step defined by a first radius and a second radius along the side wall, where the first radius is toward the lower open end of the cup and the second radius is toward the upper end of the cup along the side wall. The can comprises an upper end, a lower closed end and a side wall extending between the upper and lower can ends, the can side walls formed into a can closing radius at the shoulder area of the cell. The ratio of the total cell height to the can height is greater than 1.35. By maintaining this relationship between the total cell height and the can height, an electrochemical cell in accordance with the present invention has an increased internal volume and a more conical exterior shape compared to conventional cells. The resultant cell advantageously fits within a conical cavity and provides an increased discharge capacity, as compared to conventional cells.

The present invention further provides a button-type electrochemical cell comprising an anode cup, a cathode can and a gasket disposed between the cup and the can. The anode cup has an upper end, a lower end and side wall extending between the upper and lower ends, as well as at least one step along the side wall. Each step is defined by a first radius and a second radius along the side wall, where the first radius is toward the lower open end of the cup, and the second radius is toward the upper end of the cup along the side wall. The can has an upper end, a lower closed end and a side wall extending between the upper and lower can ends, with the can side wall formed into a cathode can closing radius at a shoulder area of the cell. A total cell height, measured from a bottom surface of said lower can end to a top surface of the upper cup end, minus a cathode can height, measured from a bottom surface of said lower can end to a top edge of said can, is greater than or equal to about 0.04 inch. The resultant cell advantageously fits within a conical cavity and provides an increased internal volume, as compared to conventional cells.

These and other features, advantages and objects of the present invention will be further understood and appreciated by those skilled in the art by reference to the following specification, claims and appended drawings.

DETAILED DESCRIPTION OF THE PREFERRED EMBODIMENT(S)

Figure 1:
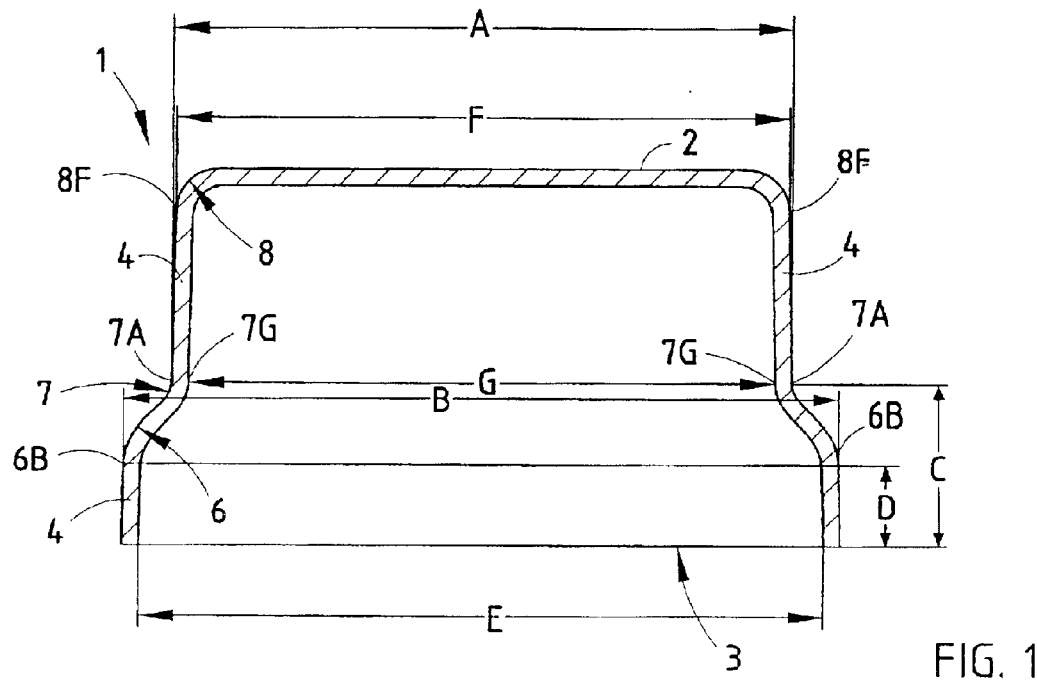
FIG. 1 is a cross-sectional view of an anode cup according to the present invention.

Referring to FIG. 1, an anode cup 1 is shown according to one embodiment of the present invention. All references to "external" dimensions herein refer to dimensions extending between points located on the external surface of the cell or component. All references to "internal" dimensions herein refer to dimensions extending between points located on internal surfaces of the cell or component. The anode cup 1 is adapted to contain an electrochemically active metal, such as zinc and electrolyte, for use in an electrochemical air cell, preferably an air depolarized alkaline cell.

The anode cup 1 comprises an upper end 2 and a lower open end 3, with a side wall 4 extending between the upper and lower ends. A step is formed along the side wall, and is defined by a first radius 6 toward the lower open end 3 of the cup and a second radius 7 toward the closed upper end 2 of the cup. Preferably, the step is formed between two substantially vertical sections of the side wall 4. As used herein "substantially vertical" means no more than about 6 degrees from true vertical. As can be seen in FIG. 1, the step comprises a horizontal component and a vertical component. The upper end of the cup 1 is defined by a corner radius 8 (two such corners appear in the section view). The cup 1 has an upper external diameter A and a lower external diameter B. The upper external diameter A is taken at the point where the second radius 7 blends into the cup side wall 4. This point is designated 7A. The lower external diameter B is taken at the point where the first radius 6 blends into the cup side wall 4. This point is designated 6B. The cup height at the upper external diameter is C in FIG. 1 and the cup height at the lower external diameter is D in FIG. 1.

The anode cup 1 further includes a first internal cup diameter E measured at the lower open end 3 of the anode cup 1, and an external cup diameter F measured at the point where the cup corner radius 8 blends into the cup side wall 4. This point is designated 8F. A second internal cup diameter G is measured at the point where the second radius 7 blends into the cup side wall 4. This point is designated 7G.

Figure 2:
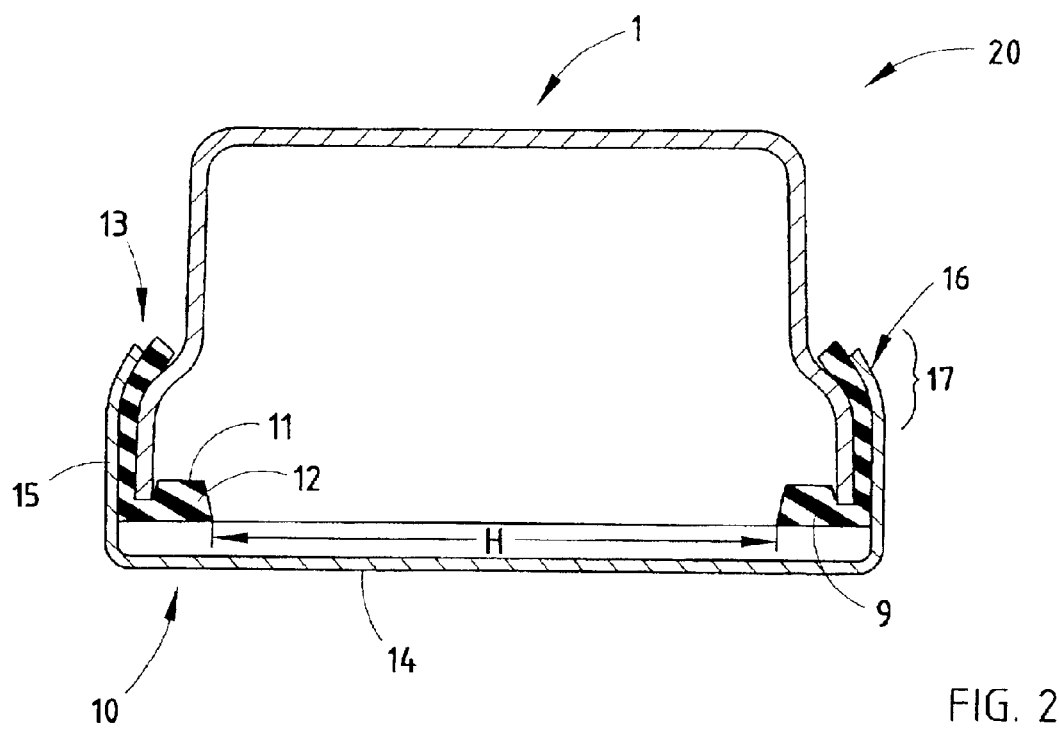
FIG. 2 is a cross-sectional view of several components of an electrochemical cell of the present invention.

FIG. 2 illustrates several components of an electrochemical cell 20 in accordance with the present invention. The cell 20 includes anode cup 1, a gasket 9, and a cathode can 10. During cell assembly, the anode cup 1 and gasket 9 are first joined prior to engagement with the cathode can 10. As used herein, an anode cup and gasket assembly refers to the anode cup 1 and gasket 9 together. The gasket 9 surrounds the open end 3 of the anode cup 1. The gasket 9 comprises an interior gasket portion 11 that extends radially inward from the interior surface of the cup side wall 4. The interior gasket portion 11 includes a gasket foot 12 defining an inner gasket diameter H measured at the smallest diameter. The cathode can 10 comprises an upper open end 13 and a lower end 14 and side wall 15 extending between the upper and lower can ends. The can side wall 15 forms a can closing radius 16 at the shoulder area 17 of the cell 20.

An example of a preferred embodiment of the present invention will now be described with reference to anode cup 1 in FIG. 3 and electrochemical cell 20 in FIG. 4. Dimensions provided for this example are summarized in Table 1 under "Example 1".

Anode cup 1 of the present invention is provided as follows. A shallow step is provided along the anode cup side wall 4 by first providing the requisite ratio of upper external diameter and lower external diameter, as defined herein. In Example 1, the cup upper external diameter A is approximately 0.29 inch and the cup lower external diameter B is approximately 0.334 inch. The ratio A/B is about 0.87, corresponding to the horizontal component of the step. For a horizontal component of about 0.86, the preferred maximum vertical component is about 2.19. With such a horizontal component, vertical components not exceeding 2.19 create a step that assures a sufficient crimping surface to seal the cell. The vertical component is determined by taking the ratio of the cup height at the upper external diameter C to the cup height at the lower external diameter D. In Example 1, the cup height at the upper diameter C is 0.079 inch and the cup height at the lower diameter D is 0.036 inch. Likewise, as will be appreciated by one skilled in the art, for a vertical component having a value of 2.19, the preferred minimum horizontal component is about 0.86. With such a vertical component, a step with a sufficient crimping surface to seal the cell is assured with a horizontal component of at least 0.86.

The anode cup 1 has a first internal cup diameter E of approximately 0.32 inch and an external cup diameter F of approximately 0.284 inch. It will be appreciated that the first internal cup diameter E will allow the upper end of a succeeding cup to intrude into the interior of the initial cup, potentially allowing both cups to "nest." In accordance with the present invention, such nesting is prevented by blocking the succeeding cup from intrusion into the initial cup beyond the step in the cup side wall of the initial cup. This is accomplished by providing a second internal cup diameter G sized so that external cup diameter F is greater than the second internal cup diameter G. In Example 1, the second internal cup diameter G is 0.274 inch (0.29–0.016 for two wall thicknesses). With this internal diameter, the succeeding cup having an external cup diameter of 0.284 inch will not pass beyond the second internal cup diameter G of the initial cup. The anode cup 1 then is provided with a gasket to form a cup and gasket assembly.

The anode cup 1 in Example 1 also has a flat horizontal section at the upper end 2 having a diameter I of about 0.244 inch. The anode cup 1 has a lower external diameter J taken at the open end 3 of about 0.336 inch. The anode cup 1 further has a vertical height K of about 0.158 inch, measured from the open end 3 to point 8F where radius 8 transitions into the substantially vertical side wall 4. Total height M of anode cup 1 is about 0.178 inch. The ratio of the total height M to a vertical midpoint of the step is about 3.09 to 1.0, where the vertical midpoint of the step is one-half the sum of dimensions C and D, and total height M is about 2.25 times height C. Anode cup 1 has a thickness L of about 0.0080 inch.

In general, it is preferred that anode cups according to the present invention have a vertical height K at least two times the cup height C at upper external diameter A. It is also preferable that the total height M is 0.178 inch or greater, though the maximum will be limited by the ability to form anode cups. Preferably total height M is greater than or equal to about two times height C. Preferred anode cups have a ratio of total height M to a vertical midpoint of the step that is grater than three to one.

An example of an electrochemical metal-air cell 20 having an anode cup 1, gasket 9, and cathode can 10 will now be described with reference to FIG. 4. The gasket 9 surrounds the open end 3 of the anode cup 1 and includes an interior gasket portion disposed radially inward from the interior surface of the cup side walls. The interior gasket portion includes a gasket foot 12 defining an inner gasket diameter H. In this specific example, the inner gasket diameter H is about 0.263 inch. With this dimension, a succeeding cup and gasket assembly will not be able to intrude into the open end of the initial cup and gasket assembly, since the external cup diameter F of 0.284 inch exceeds the inner gasket diameter H.

It will be appreciated that the inner gasket portion can be appropriately minimized to retain as much volume as possible for active materials and still provide an inner gasket diameter of appropriate dimension to prevent nesting of succeeding cup and gasket assemblies. For example, the gasket foot can comprise a projection extending radially inward at one or more locations around the gasket portion. The inner gasket diameter is then measured using the projection, the projection providing a reduced diameter sufficient to prevent the intrusion of a succeeding cup and gasket assembly into the initial cup and gasket assembly.

Figure 4:
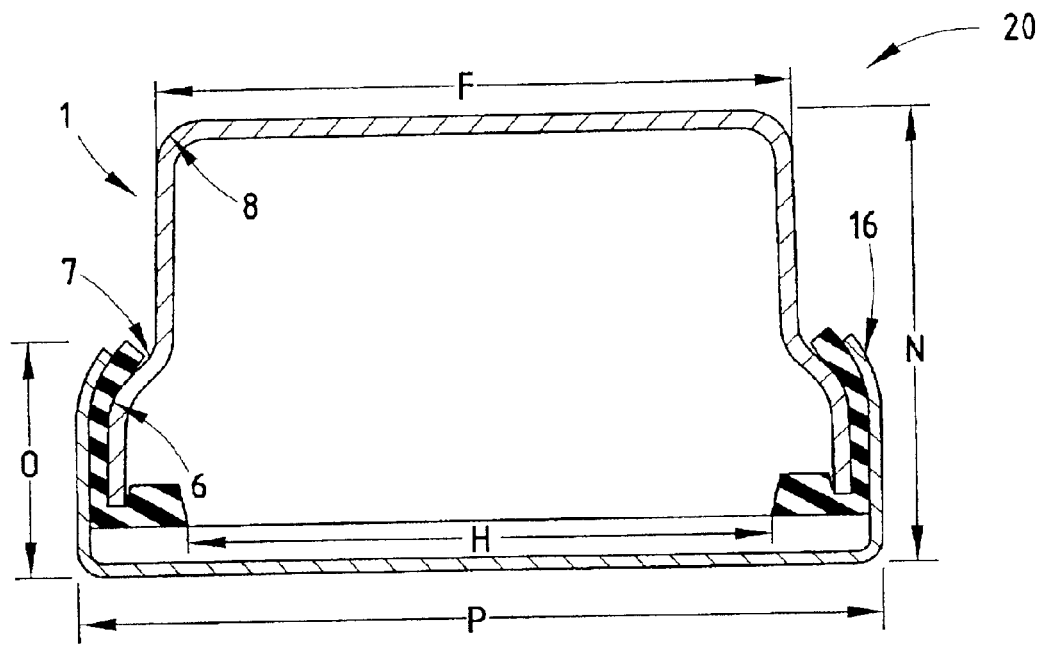
FIG. 4 is a further representation of the electrochemical cell shown in FIG. 2.

In FIG. 4, cell 20 includes an anode cup 1, a cathode can 10, and a gasket 9 disposed in relation to each other. The anode cup 1 comprises an upper end 2, a lower open end 3 and side wall 4 extending between the upper and lower ends. A step is defined along the side walls and is defined by a fist cup radius and a second cup radius, the first cup radius being close to the lower open end of the cup and the second cup radius being closer to the upper end of the anode cup. The cathode can side wall is formed into a can closing radius 16 that is greater than the first radius 6 defining the anode cup step. In Example 1, the first cup radius 6 has a value of 0.033 inch, while the can closing radius 16 has a value of 0.060 inch. The closing radius 16 is larger than radius 6 so that the gasket 9 has maximum compression at about 6B on anode cup 1. At locations above point 6B, the seal 9 is compressed to a lesser degree as compared to the compression experienced at point 6B.

Without being bound to a particular theory or explanation, it is believed that providing a radius for the can closing radius 16 that exceeds the first cup radius 6 results in a localization of the closing or crimping force. This localization causes the gasket 9 to experience an increased amount of strain, resulting in a seal having improved performance.

The electrochemical cell 20 of Example 1 is further shown having a total height N, measured from a bottom surface of the lower can end to a top surface of the upper cup end, of about 0.210 inch. The height O of side wall 15 of cathode can 10, measured from a bottom surface of the lower can end to a top edge of the can, is about 0.106 inch. Accordingly, the difference of total height N minus can height O is about 0.104 inch, and the height ratio N/O is approximately 1.9. The lower end 14 of cathode can 10 has a diameter P of about 0.361 inch.

Figure 3:
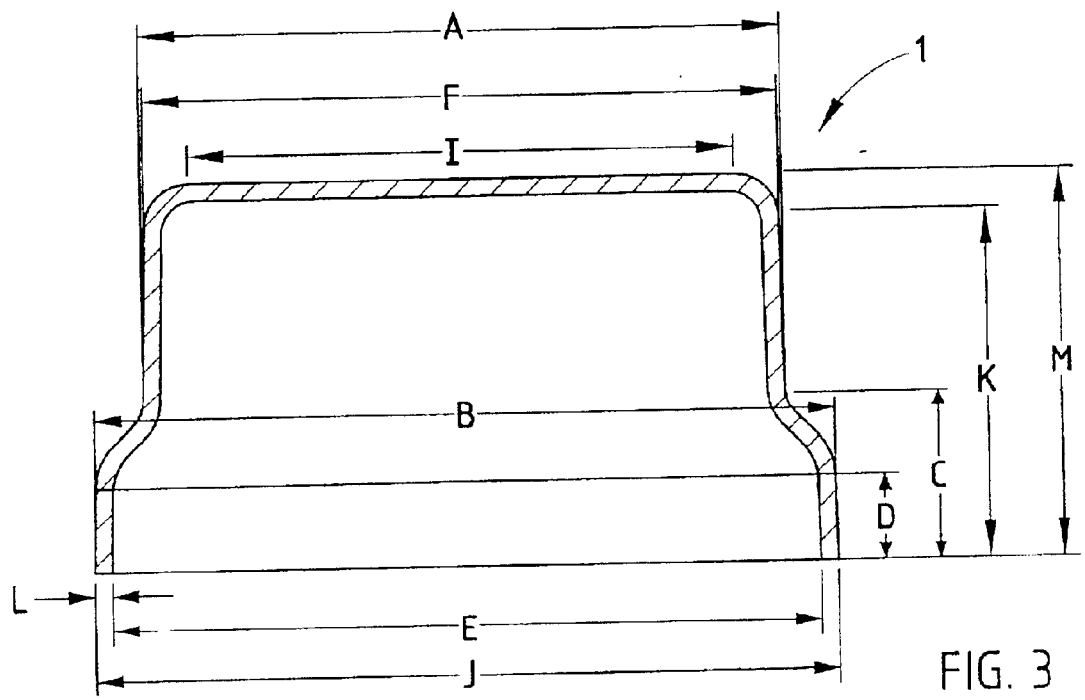
FIG. 3 is a further representation of the anode cup shown in FIG. 1.

Example 2 is another embodiment of the present invention illustrated in FIGS. 3 and 4. The dimensions of anode cup 1 and electrochemical cell 20 according to Example 2 are also summarized in Table I. The electrochemical cell 20 of Example 2 has a total cell height N, measured from a bottom surface of the lower can end to a top surface of the upper end, of about 0.161 inch and a can height O, measured from a bottom surface of the lower can end to a top edge of the can, of about 0.116 inch. Accordingly, the difference of total cell height N minus can height O is about 0.045 inch, and the height ratio N/O is about 1.39.

Accordingly, the electrochemical cell 20 of the present invention has been described in connection with an example provided in FIGS. 3 and 4. The dimensions, and tolerances, provided in Examples 1 and 2 are further recited in the Table I as follows:

TABLE I

| Reference | Dimension (inch) Example 1 | Dimension (inch) Example 2 | Tolerance (inch) |
|---|---|---|---|
| A | 0.290 | 0.224 | ±0.001 |
| B | 0.334 | 0.280 | ±0.001 |
| C | 0.079 | 0.106 | |
| D | 0.036 | 0.045 | |
| E | 0.32 | 0.271 | |
| F | 0.284 | 0.224 | ±0.001 |
| G | 0.274 | 0.214 | |
| H | 0.263 | 0.234 | |
| I | 0.244 | 0.192 | |
| J | 0.336 | 0.282 | ±0.001 |
| K | 0.158 | 0.115 | |
| L | 0.0080 | 0.0050 | ±0.0005 |
| M | 0.178 | 0.131 | ±0.001 |

TABLE I-continued

| Reference | Dimension (inch) Example 1 | Dimension (inch) Example 2 | Tolerance (inch) |
|---|---|---|---|
| N | 0.210 | 0.161 | ±0.002 |
| O | 0.106 | 0.116 | ±0.002 |
| P | 0.361 | 0.3045 | ±0.001 |
| 6 | 0.033 | 0.033 | ±0.001 |
| 7 | 0.020 | 0.050 | |
| 8 | 0.020 | 0.016 | ±0.002 |
| 16 | 0.060 | 0.065 | |

In general, cells of the present invention preferably have a height ratio N/O greater than 1.35, more preferably greater than 1.50, yet more preferably greater than 1.7, and most preferably greater than 1.9. The difference of total cell height N minus can height O of cells of the present invention is preferably greater than or equal to about 0.04 inch, more preferably greater than or equal to about 0.06 inch, yet more preferably greater than or equal to about 0.08 inch, and most preferably greater than or equal to about 0.10 inch.

Electrochemical cell 20, described in Examples 1 and 2 in Table I and shown in FIGS. 3 and 4, is a button cell having a total height N no larger than the diameter P of the can. A button cell is a preferred embodiment, particularly an air-depolarized button cell. However, it will be appreciated that the present invention can be practiced with a wide variety of electrochemical cells.

The present invention is not limited to particular cell wall thicknesses for the cup, can or gasket, or to the material compositions of the various cell components. It will also be appreciated that the within invention can be practiced with various shaped cells, including round, oval, square, prismatic or other configurations.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An anode cup for an electrochemical cell, comprising:
   a closed upper end;
   an open lower end with a terminal edge;
   a side wall extending between the upper and lower ends and comprising a step, an upper side wall above the step and a lower side wall below the step;
   a maximum upper external diameter;
   an internal cup diameter measured at the open lower end; and
   a lower external diameter; wherein
   said internal cup diameter is larger than said maximum upper external cup diameter;
   a ratio of said maximum upper external diameter to said lower external diameter is greater than or equal to about 0.86; and
   a ratio of a cup height from the terminal edge to an uppermost part of the step to a cup height from the terminal edge to a lowermost part of the step is not greater than about 2.19.

2. The anode cup of claim 1, said anode cup comprising:
   a first vertical height from said open lower end to a first point, where the substantially vertical side wall section blends into a corner radius thereby joining the side wall with said closed upper end; and
   a second vertical height from said open lower end to a second point, where the substantially vertical wall section blends into a radius thereby joining the substantially vertical wall section with the step;
   wherein the difference of said first vertical height minus said second vertical height is greater than zero.

3. The anode cup of claim 2, wherein said first vertical height is at least two times said second vertical height.

4. The anode cup of claim 1, wherein a total height of said cup is at least 0.178 inch.

5. An anode cup and gasket assembly for an electrochemical cell, comprising:
   an anode cup according to claim 1; and
   a gasket surrounding the open end of said cup, wherein said gasket comprises an interior gasket portion disposed radially inward from the interior surface of said cup side wall, the interior gasket portion defining an inner gasket diameter, and the external cup diameter exceeding the inner gasket diameter.

6. The assembly of claim 5, wherein the interior gasket portion comprises a gasket foot defining said inner gasket diameter.

7. The assembly of claim 6, wherein the interior gasket portion further comprises at least one projection extending radially inward from the gasket foot, said projection defining said inner gasket diameter.

8. The assembly of claim 5, wherein:
   the side wall further comprises a step defined by a first radius, toward the lower end, and a second radius, toward the upper end;
   the anode cup comprises a rounded corner, having a radius, where the upper end and side wall meet; and
   the side wall is substantially vertical between the point where the cup corner radius blends into the cup side wall and the point where the second radius blends into the cup side wall.

9. The assembly of claim 8, wherein said anode cup further comprises a first vertical height, measured from said lower end to a point where the cup corner radius blends into the cup side wall, and a second vertical height, measured from said lower end to a point where the second radius blends into the cup side wall, and when the difference of the first vertical height minus the second vertical height is greater than zero.

10. The assembly of claim 9, wherein the first vertical height is at least two times the second vertical height.

11. An electrochemical cell comprising:
    an anode cup according to claim 1;
    a cathode can having an upper end and a lower closed end and side wall extending between the upper and lower can ends said can side wall formed into a cathode can closing radius at a shoulder area of the cell; and
    a gasket disposed between the anode cup and the cathode can;
    wherein the ratio of a total cell height, measured from a bottom surface of said lower can end to a top surface of said upper cup end, to a cathode can height, measured from a bottom surface of said lower can end to a top edge of said can, is greater than 1.35.

12. The cell of claim 11, wherein the ratio of a total cell height to a can height is greater than 1.5.

13. The cell of claim 12, wherein the ratio of a total cell height to a can height is greater than 1.7.

14. The cell of claim 13, wherein the ratio of a total cell height to a can height is greater than 1.9.

15. The cell of claim 11, wherein the cell is a button cell, having a total cell height, measured from a bottom surface of said lower can end to a top surface of said upper cup end, that is not larger than the maximum outer diameter of said can.

16. The cell of claim 15, wherein the button cell is an air depolarized alkaline cell.

17. The cell of claim 15, wherein the total cell height minus the cathode can height is greater than or equal to about 0.04 inch.

18. The cell of claim 17, wherein the total cell height minus the cathode can height is greater than or equal to about 0.06 inch.

19. The cell of claim 17, wherein the total cell height minus the cathode can height is greater than or equal to about 0.08 inch.

20. The cell of claim 17, wherein the total cell height minus the cathode can height is greater than or equal to 0.10 inch.

21. An electrochemical cell comprising:

an anode cup comprising a closed upper end, an open bottom end with a terminal edge and a side wall extending between the upper and lower ends of the cup;

a cathode can comprising a closed lower end, an upper end and a side wall extending between the upper and lower ends of the cup; and a gasket disposed and providing a seal between the anode cup and the can; wherein:

the anode cup comprises a rounded corner where the closed cup end meets the side wall, and the rounded corner comprises a corner radius where the corner blends with the can wall;

the anode cup side wall comprises a step between the upper and lower ends of the cup, the step defined by a first step radius toward the lower end of the cup and a second step radius toward the upper end of the cup;

the anode cup side wall comprises a maximum upper external diameter between the second step radius and the corner radius, a lower external diameter below the first step radius and an internal diameter at the open end of the cup;

the anode cup comprises a height from the terminal edge of the cup to the bottom of the first step radius and a height from the terminal edge of the cup to the top of the second step radius;

the internal diameter is greater than the maximum upper external diameter, a ratio of the maximum upper diameter to the lower external diameter is greater than or equal to about 0.86 and a ratio of the height to the top of the second step radius of the cup to the height to the bottom of the first step radius of the cup is not greater than about 2.19.

* * * * *